United States Patent [19]

Strombom

[11] Patent Number: 5,860,246

[45] Date of Patent: Jan. 19, 1999

[54] SOD MAT FOR ESTABLISHING PLANTS

[75] Inventor: Dan Bryan Strombom, Milltown, N.J.

[73] Assignee: Rutgers University, New Brunswick, N.J.

[21] Appl. No.: 587,557

[22] Filed: Jan. 17, 1996

[51] Int. Cl.$^6$ .............................. A01B 79/00; A01C 1/00; A01C 1/04; A01N 3/00; A41G 1/00

[52] U.S. Cl. ................................. 47/58; 47/56; 47/1.01; 47/9; 428/17

[58] Field of Search ............................... 47/58, 56, 1.01, 47/9; 428/17

[56] References Cited

U.S. PATENT DOCUMENTS

| | | | |
|---|---|---|---|
| 2,264,973 | 12/1941 | Guarino | 47/37 |
| 2,605,589 | 8/1952 | Kuestner | 47/58 |
| 2,876,588 | 3/1959 | Tietz et al. | 47/58 |
| 2,923,093 | 2/1960 | Allen | 47/56 |
| 3,154,884 | 11/1964 | Amar et al. | 47/1 |
| 3,557,491 | 1/1971 | Franklin et al. | 47/56 |
| 3,863,388 | 2/1975 | Loads | 47/56 |
| 3,890,739 | 6/1975 | Blackburn | 47/56 |
| 3,914,901 | 10/1975 | Muldner | 47/56 |
| 4,023,506 | 5/1977 | Robey | 111/1 |
| 4,190,981 | 3/1980 | Muldner | 47/56 |
| 4,232,481 | 11/1980 | Chamoulaud | 47/56 |
| 4,283,445 | 8/1981 | Bartholl | 428/17 |
| 4,336,668 | 6/1982 | Decker | 47/58 |
| 4,786,550 | 11/1988 | McFarland et al. | 428/203 |
| 4,934,094 | 6/1990 | Walton | 47/56 |
| 4,941,282 | 7/1990 | Milstein | 47/58 |
| 4,990,175 | 2/1991 | Petroff et al. | 71/92 |
| 5,224,290 | 7/1993 | Molnar et al. | 47/56 |

OTHER PUBLICATIONS

Dan Strombom, "Alternative Sod Production–Groundcovers," Report to The Amer. Sod Prod. Assn. (Jul. 8, 1994).

*Primary Examiner*—David T. Fox
*Assistant Examiner*—Kent L. Bell
*Attorney, Agent, or Firm*—Synnestvedt & Lechner

[57] ABSTRACT

An improved method of establishing plantings in sod mats which are capable of being transported as a unit and reestablished without significantly disturbing the root system of the plants. The sod mats established from grass turf sod, by utilizing the matted, dead grass roots of turf sod as a biodegradable medium for anchoring the roots of the growing plants, the plant roots being intermeshed with the matted grass roots. The sod mat allows for the production of a diversity of sod mat products, including annual and perennial ornamental plants, herbs, and edible plants, among others. While the plants can be grown to various sizes depending on market desires and mature plant height, the sod mats are capable of rapidly establishing sufficient stability to withstand lifting and transportation, thus providing a significant improvement over sod-like mats of the prior art.

34 Claims, 3 Drawing Sheets

SOD MAT FOR ESTABLISHING PLANTS

FIELD OF THE INVENTION

This invention relates to sod mats for establishing plantings of annual and perennial ornamental and edible plants.

BACKGROUND OF THE INVENTION

The turf grass sod industry holds a preeminent position among grass growers because economies of scale allow for extremely efficient production of the product. Namely, large quantities of turf grass, in the form of a sod mat, can be easily grown, lifted and transported as one unit, and replanted at a remote, secondary location.

Growers of plants other than turf grasses have attempted to emulate the desirable features of grass sod by constructing various sod-like mats to enable their use as a planting medium or to be used as a base for seeding and/or transplanting other plant material. Once the plants are established, the sod-like mats, along with the established plants are intended to thereafter be transported for replanting. However, all plants do not have what is required to enable efficient utilization of the sod-like mats as a planting medium, namely the needed root knitting characteristic exhibited by grass and which imparts the required stability to grass sod. Consequently, in attempts to impart the necessary structural integrity to such simulated mats and to enhance their root knitting ability with the plants thereon, the sod-like mats of the prior art typically include a layer or layers of wood chips and/or other mulch and an underlying layer or layers of synthetic anchoring material such as netting or fabric into which the roots of the seeded and/or transplanted plants can grow and become anchored.

U.S. Pat. No. 4,941,282 to Milstein requires a polyester fabric sheet underlaying the planting medium. U.S. Pat. No. 5,224,290 to Molnar et al. discloses a nylon spunbonded fabric as the sod reinforcement. U.S. Pat. No. 3,863,388 to Loads uses an inert mesh material as a base for roots to intertwine.

There are several disadvantages to such prior methods: (a) in constructing the mats it is cumbersome, time-consuming, and, therefore, expensive to spread out multiple layers of base material, the sod reinforcement, and then the growing medium; (b) in field growing conditions it is difficult to obtain an even thickness of growing medium; (c) the time period required for root anchoring can vary greatly, depending on environmental conditions and the crop grown, from approximately two (2) months to one (1) year; and (d) the synthetic anchoring material is either not biodegradable or is photodegradable and, in the latter case, most of the material would not degrade, as it is buried.

Therefore, the objects and advantages of the present invention are as follows:

(a) to provide a sod mat which has the advantages of turf grass sod, for establishing plantings of annual and perennial ornamental and/or edible plants and the like, and especially those having an adventitious or fibrous root system;

(b) to provide a sod mat in which the knitted and matted roots of killed grass provide a support or anchoring system for the fibrous roots of such plants;

(c) to provide a sod mat having a support or anchoring system which is biodegradable;

(d) to provide a sod mat which will anchor plant roots rapidly, thereby requiring a shorter time period for the establishment of such plantings;

(e) to provide a sod mat for other plants, the construction and establishment of which is less cumbersome, time consuming and expensive than the sod-like mats of the prior art;

(f) to provide a sod mat which possesses the requisite strength and integrity to withstand handling and transporting, and where such integrity is able to be maintained even when the sod is placed or attached in a substantially vertical position;

(g) to provide a sod mat which eliminates the traditional need of growers and retailers for plant containers, and provides a convenient method of transporting and planting already-established plantings for ornamental purposes; and (h) to provide a sod mat which can be laid permanently or temporarily for such ornamental purposes.

Other objects and advantages of the subject invention will become apparent after considering the following description and the accompanying drawings.

SUMMARY OF THE INVENTION

In accordance with the product aspects of the present invention, the foregoing objects and advantages are accomplished by providing a sod mat comprising a section of grass covered surface soil held together by its matted grass root system, said grass and its roots being dead, said grass root system being free of substantial biodegradation or disentanglement of the matted dead grass roots, said sod having herbaceous plant propagating material implanted in and growing thereon and wherein said plant material has a fibrous root system intermeshed with and supported by said dead grass root system.

In accordance with the method aspects of this invention, the foregoing objects and advantages are accomplished by providing a method of establishing a planting of plant propagating material that is capable of being moved as a unit and reestablished without significantly disturbing the root systems of the plants. In particular, the method comprises killing the grass and grass root system in a section of sod in which the surface soil is held together by its matted grass root system, and, before substantial biodegradation or disentanglement of the matted grass root system, implanting in the sod section plant propagating material of a plant or plants having a fibrous root system, and allowing said plant propagating material to develop to the point where the sod section is stabilized and its integrity can be maintained by the intermeshing of the plant fibrous root system with the matted dead grass root system.

BRIEF DESCRIPTION OF THE INVENTION

DETAILED DESCRIPTION OF THE PREFERRED EMBODIMENT

Figure 1:
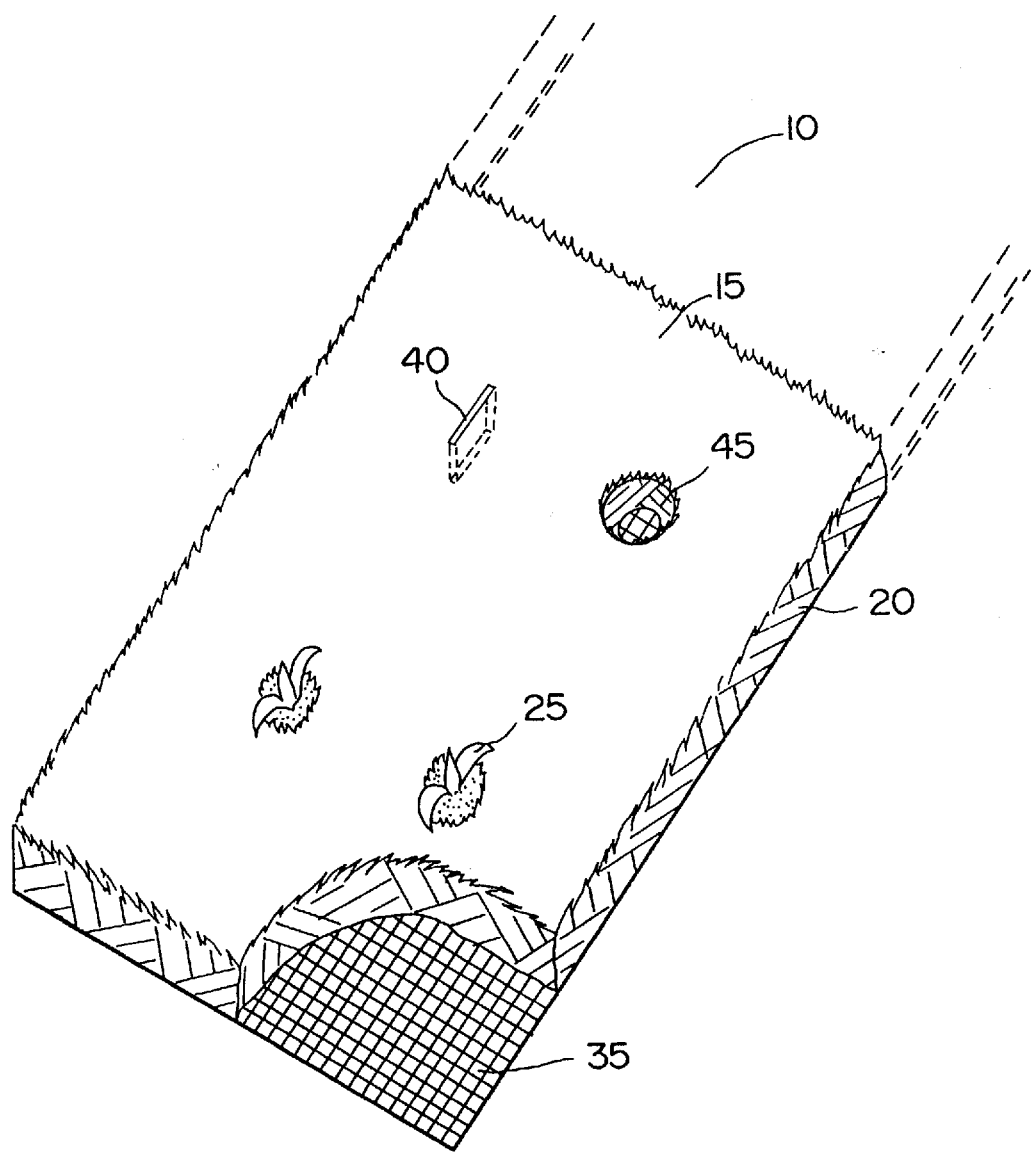
FIG. 1 is a perspective view, partly in section, of the sod mat of this invention, that also illustrates the process of transplanting plant propagating material such as plant plugs, cuttings, root divisions, and/or seedlings and the like into the sod mat.

Referring to the Figures, the sod mat of this invention comprises, generally, a section of turf sod 10 (also referred to herein as "sod section" or "turf sod mat") comprising grass covered surface soil held together by its matted grass root system, the turf sod being about one (1) to about two (2) inches in thickness. The grass 15 of the turf sod is dead; however, the roots 20 of the dead grass are not substantially biodegraded or disentangled, such that those matted roots 20 provide the support and anchoring system for the plant propagating material 25 and, in particular, the roots 30 of such plant material, implanted in the sod section.

While the preferred embodiments set forth herein are directed to turf sod which has been harvested, it is contemplated that the plant propagating material of this invention may be implanted into sections of turf sod which have not yet been harvested, and such an embodiment is intended to be within the scope of this invention.

In preferred embodiments, the section of harvested turf sod 10 is prepared for planting by laying or positioning the sod section or row on a support surface 35 under the root side of the sod section, which is preferably impermeable to root penetration. This support surface 35 may be formed of any suitable material known in the art, such as concrete, wood, or metal; but preferably comprises a flexible, plastic sheet material. The plastic sheeting support surface 35 may be placed on the ground or elevated on benches, so long as drainage for water is provided—either through holes in or sloping of the surface 35. If production is elevated off the ground, the surface 35 need not be root impermeable. If production is on the ground, the surface 35 should be opaque to eliminate weed growth contamination from underneath. Furthermore, the support surface 35 may be used not only during the growing period as herein described, but, in certain embodiments, the sheeting or other support surface under the root side of the sod section may remain with and be used as a carrier to transport the sod mat. In further embodiments, the support surface may remain with the established sod mat even after planting and re-establishment of the sod mat, in which case the support surface is preferably biodegradable.

The grass of the turf sod is to be killed prior to the implanting of the plant material, as the end-product of this invention is not a turf grass sod product, but a sod product having annual or perennial ornamental plants and herbs and/or other edible plants established and growing thereon. To kill the turf grass, the turf sod is preferably treated with a general purpose herbicide such as glyphosate, available as Roundup® manufactured by Monsanto Corporation, which is carried throughout the grass and its roots but is not active in the soil itself. The herbicide is applied at a rate recommended for turf grass. The purpose of the herbicide is to kill the grass, the grass roots, and any existing weeds. The herbicide may be applied either within about five (5) days before harvesting or after the turf sod is harvested. Although using a herbicide is the preferred means for killing the grass, an alternative which is understood to be within the scope of this invention is to kill the grass naturally, for example, by storing the turf sod in a covered area until desiccation kills the grass. It is further contemplated that the grass can be killed either naturally or chemically and either before or after harvesting the turf sod. In either case, the grass blade layer 15, when dead, functions as a mulch to discourage weed growth.

The desired plant propagating material can be implanted in the sod mat once the herbicide is no longer active. While the grass itself will not be completely killed for about fourteen (14) days or more, it has been found that the desired plant material may be implanted at any time after about six (6) days, and preferably at any time after about seven (7) to eight (8) days, from the time the herbicide is applied. The desired plants can be propagated by inserting plant propagating material 25 into the turf sod mat 10. This plant propagating material may include, seeds, transplants, plant plugs, cuttings, root divisions, seedlings and the like, and the term "plant propagating material" is intended to include all such alternatives. Reference number 25 may also represent other means of starting plants as known in the art, such as cuttings and viable plant material derived from various types of plant tissue culture and these other means are, thus, meant to be included in the "plant propagating material" definition above.

Referring to FIG. 1, wherein transplants are the relevant plant propagating material 25, transplants are established in the turf sod mat by cutting openings such as slits 40 or holes 45 in the mat slightly larger than the diameter of the transplant root mass. Spacing of the transplants should approximate the diameter of the plants when mature; depending on the species and cultivar, such spacing may vary from about six (6) to about twenty-four (24) inches or more. For most ornamental bedding plants, transplants should be spaced about nine (9) to about twelve (12) inches apart.

Figure 2:
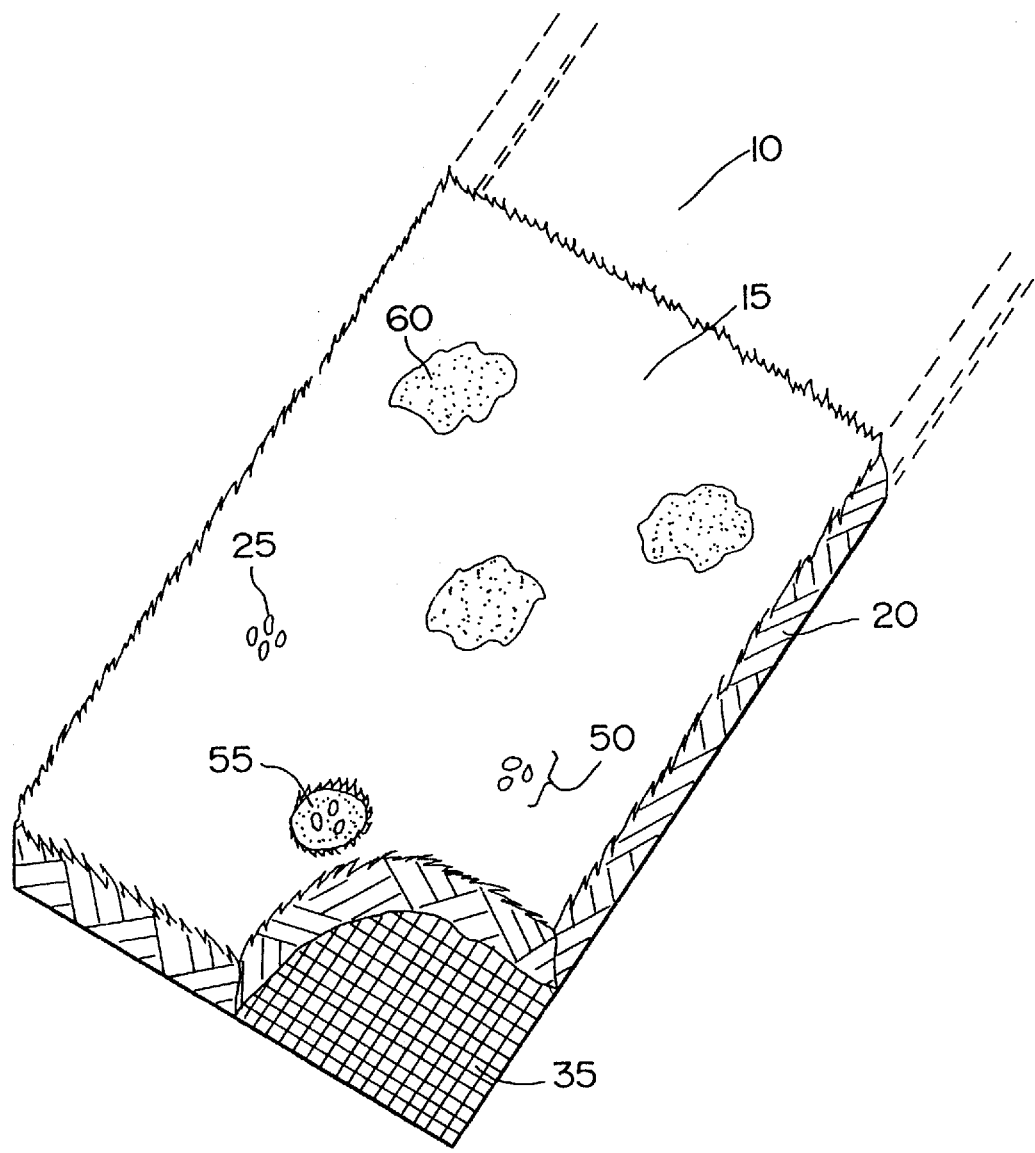
FIG. 2 is a perspective, partly sectional view of the sod mat of this invention, that also illustrates the process of establishing plants within the sod mat by seeding.

Referring to FIG. 2, wherein seeds are the relevant plant propagating material 25, starting plants in the turf sod mat 10 from seeding may be accomplished in several ways. For plants such as bedding plants and edible plants which grow best without competition from neighboring plants, about two (2) to about four (4) seeds should be placed together in groups 50. The distance between groups 50 of seeds should be approximately the diameter of the plants when mature.

The seeds may be placed on top of the layer of dead grass blades 15 or areas of dead grass blades may be sheared or otherwise removed to expose soil 55 for improved soil contact. There may additionally, or alternatively, be provided a layer of growing medium 60 overlying the surface soil and underlying the sown seeds. Once the seeds have germinated and the first true leaves appear, the plants should be thinned leaving the single healthiest or most vigorously growing seedling in each group 50. For plants such as wild flowers, which commonly grow close together, the seeds may be broadcast seeded over the surface of the turf sod mat 10 at a density of about one (1) to two (2) pounds of seed per five hundred (500) square feet of mat surface area, and thinning would not be necessary.

Where the seeds can be light germinated, the seeds may simply be placed or sown on top of the section of sod or layer of growing medium, without covering with additional soil or other growing medium. Seeds which require covering to germinate should be covered with a layer of growing medium 60 of weed-free humus, compost, or a commercially prepared mix. The layer of growing medium 60 should be approximately as deep as the diameter of the seed.

As soon as the plant propagating material 25, e.g. seeds or transplants, are in place on or in the turf sod mat 10, the mat is moistened and kept moist until harvested. The plants can be propagated indoors or outdoors provided that the temperature and sunlight requirements of plant growth stages are met. The turf sod mat 10 containing seeds or transplants should be fertilized by about the third week of production. A water soluble fertilizer such as Peters Excel 21-5-20 at a concentration of 200–250 ppm Nitrogen should be applied about every three (3) to four (4) weeks. Alternatively, a slow release fertilizer such as Osmocote 14-14-14 manufactured by Sierra Chemical Company may be applied initially at a rate of approximately 5.5 pounds per 100 square feet with supplemental fertilization with a water soluble fertilizer as needed.

The plant propagating material 25 of this invention is importantly that of plants which have a fibrous root system. The term "fibrous root system" is understood to include both adventitious root systems and primary root systems, as well as root systems including creeping rhizomes; but, in the case of a primary root system, the primary root must be one which is quickly divided into several or many roots and, in particular, cannot include a taproot. Importantly, the term "fibrous root system" is intended to exclude both taproot systems and bulbs, since such root systems have been found difficult to establish in the limited depth of the sod mat.

Figure 3:
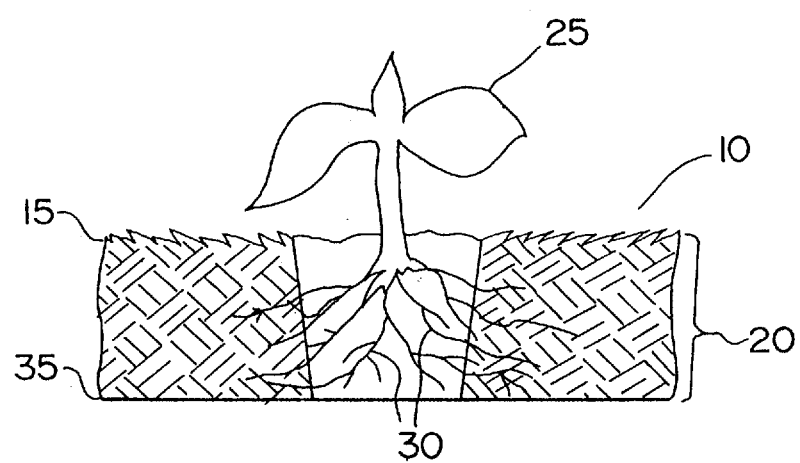
FIG. 3 is a cut-away view of the sod mat of this invention, illustrating the roots of the plant material intermeshed with the matted, knitted grass roots of the sod section.

Referring to FIG. 3, within about three (3) to four (4) weeks following germination of the seeds or insertion of the transplants, the plant roots 30 are sufficiently knitted and intermeshed into the turf sod mat 10, namely into the matted grass roots 20 of the sod mat 10, such that the established sod-mat and plants can be lifted and transported. This period of time is particularly and importantly distinguishable from the sod-like mats of the prior art which require at least two (2) to about twelve (12) months to mature into a sod prior to harvesting or transporting. Thus, the particular growth period required prior to transporting the sod mat will be determined by market requirements for the stage of plant maturity, depending on the particular plants being established on the mat, without being limited or constrained by time periods required for establishing a strong and stable root system. Experience with growth trials indicates that the plant growth rates themselves are not significantly different from those grown by conventional methods.

It has importantly been determined that, due to the characteristic knitting and intermeshing of the plant roots with the matted grass roots, the sod mats according to this invention demonstrate not only distinctive rapid establishment of stability, but also distinctive strength and integrity to withstand handling and transporting of the sod mat as a single unit. Depending on the size and type of plant grown, the sod-mat may either be rolled or transported flat; low-growing, flexible plants such as Nierembergia are not affected significantly by rolling while a mat containing tall, brittle plants such as mature Impatiens should remain flat.

The sod mat may then be established permanently at a landscaping site or may be temporarily laid indoors or outdoors, on any surface that will support the mat. In addition, it has been found that the sod mats of this invention are uniquely capable of maintaining the same strength and integrity which permits the lifting and transportation as a unit, even when the sod mat is substantially vertically positioned. Namely, the sod mats are sufficiently strong to allow attachment to steeply inclined or substantially vertical surfaces, such as trellises or pillars, for example, using wire to encircle the surface or wire stapled through the mat.

The terms and expressions used herein are used merely as terms of description and not of limitation, and the use of such terms is not intended to exclude equivalents of the features shown and described, or portions thereof, it being recognized that various modifications are possible within the invention as claimed.

What is claimed is:

1. A method of establishing a planting of plant propagating material that is capable of being moved as a unit and reestablished without significantly disturbing the root system of the plants, said method comprising killing the grass and grass root system in a section of sod in which the surface soil is held together by its matted grass root system, and, before substantial biodegradation or disentanglement of the matted grass root system, implanting in said sod section plant propagating material of a plant or plants having a fibrous root system, and allowing said plant propagating material to develop to the point where the sod section is stabilized and its integrity can be maintained by the intermeshing of the plant fibrous root system with the matted dead grass root system.

2. The method of establishing a planting of plant propagating material according to claim 1 which comprises killing the grass, grass roots and any weeds growing in said sod section with a herbicide and wherein the herbicidal activity has become inactive prior to implanting and growing of the plant propagating material.

3. The method of establishing a planting of plant propagating material according to claim 1 wherein the sod section is killed naturally and is harvested either before or after killing the grass and its root system.

4. The method of establishing a planting of plant propagating material according to claim 2 wherein the sod section is harvested either before or after herbicide treatment to kill the grass, its root system and any weeds growing therein.

5. The method of establishing a planting of plant propagating material according to claim 3 wherein the sod section is further strengthened by being positioned on a support surface under the root side of the sod section.

6. The method of establishing a planting of plant propagating material according to claim 4 wherein the sod section is further strengthened by being positioned on a support surface under the root side of the sod section.

7. The method of establishing a planting of plant propagating material according to claim 5 wherein said support surface is provided with means for water drainage.

8. The method of establishing a planting of plant propagating material according to claim 6 wherein said support surface is provided with means for water drainage.

9. The method of establishing a planting of plant propagating material according to claim 1 wherein said plant propagating material comprises seedlings germinated from seeds sown on said surface soil.

10. The method of establishing a planting of plant propagating material according to claim 9 wherein the germinated plant material comprises seedlings growing in an area of exposed surface soil on said sod section.

11. The method of establishing a planting of plant propagating material according to claim 9 and further having a layer of growing medium overlying said sown seeds.

12. The method of establishing a planting of plant propagating material according to claim 9 and further having a layer of growing medium overlying said surface soil and underlying said sown seeds.

13. The method of establishing a planting of plant propagating material according to claim 1, wherein said plant propagating material is implanted in openings in said dead grass and dead grass root system, and wherein said plant propagating material is selected from the group consisting of seeds, transplants, cuttings, root divisions, seedlings and the like.

14. The method of establishing a planting of plant propagating material according to claim 3 wherein the fibrous root system is intermeshed with and anchored within said dead grass root system to provide the sod section with sufficient strength and integrity to withstand handling and transporting said sod section as a unit.

15. The method of establishing a planting of plant propagating material according to claim 14 and having sufficient strength to maintain the integrity of the sod section even when the sod is substantially vertically positioned.

16. The method of establishing a planting of plant propagating material according to claim 5, wherein said support surface comprises a plastic sheeting.

17. The method of establishing a planting of plant propagating material according to claim 6, wherein said support surface comprises a plastic sheeting.

18. A method of establishing a planting of plant propagating material comprising:

providing an anchoring system for said plant material, said anchoring system comprising a section of turf sod, the sod section comprising grass covered surface soil held together by a grass root system, the grass and roots being dead and the grass root system being free of substantial biodegradation or disentanglement;

implanting in the sod section plant propagating material; and allowing the plant material to develop until such time when the roots of the plant material are intermeshed with the dead grass root system such that the sod section is stabilized and its integrity can be maintained.

19. The method according to claim 18 wherein the sod section comprises grass that has been killed naturally.

20. The method according to claim 18 wherein the sod section comprises grass that has been killed with a herbicide, and wherein the herbicide has become inactive prior to the implanting step.

21. The method according to claim 19 wherein the sod section is further strengthened by being positioned on a support surface under the root side of the sod section.

22. The method according to claim 21 wherein said support surface comprises plastic sheeting.

23. The method according to claim 21 wherein said support surface is provided with means for water drainage.

24. The method according to claim 20 wherein the sod section is further strengthened by being positioned on a support surface under the root side of the sod section.

25. The method according to claim 24 wherein said support surface comprises plastic sheeting.

26. The method according to claim 24 wherein said support surface is provided with means for water drainage.

27. The method according to claim 18 wherein said plant propagating material comprises seedlings germinated from seeds sown on said surface soil.

28. The method according to claim 27 wherein the germinated plant material comprises seedlings growing in an area of exposed surface soil on said sod section.

29. The method according to claim 27 further comprising a layer of growing medium overlying said sown seeds.

30. The method according to claim 27 further comprising a layer of growing medium overlying said surface soil and underlying said sown seeds.

31. The method according to claim 18 wherein said plant propagating material is implanted in openings in said sod section.

32. The method according to claim 31 wherein said plant propagating material is selected from the group consisting of seeds, transplants, cuttings, root divisions, and seedlings.

33. The method according to claim 18 wherein the roots of the plant material are intermeshed with and anchored within the dead grass root system to provide the sod section with sufficient strength and integrity to withstand handling and transporting said sod section as a unit.

34. The method according to claim 33 wherein the sod section demonstrates sufficient strength to maintain the integrity of the sod section when the sod is positioned substantially vertically.

* * * * *